Figure 1:
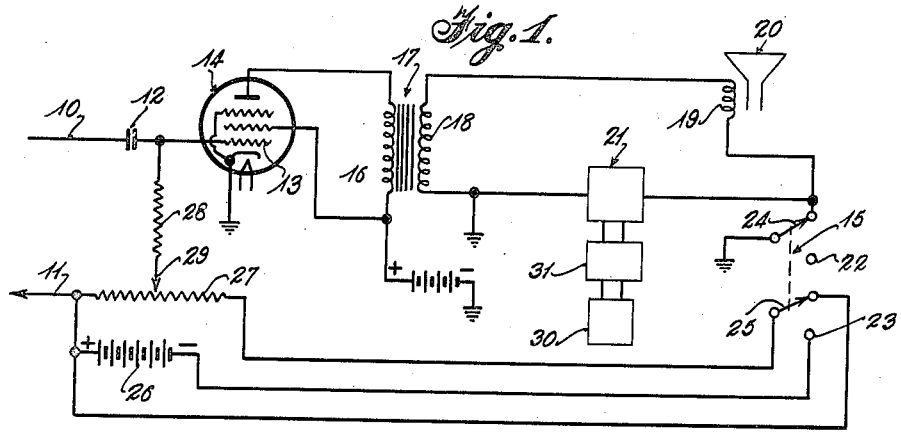

July 21, 1942.   E. M. SHOOK ET AL   2,290,773
ELECTRIC SEISMOGRAPH
Filed Oct. 23, 1940   2 Sheets-Sheet 1

Inventors
*Earley M. Shook* and
*Robert W. Olson*

By *Dallas R. Lamont*
Attorneys

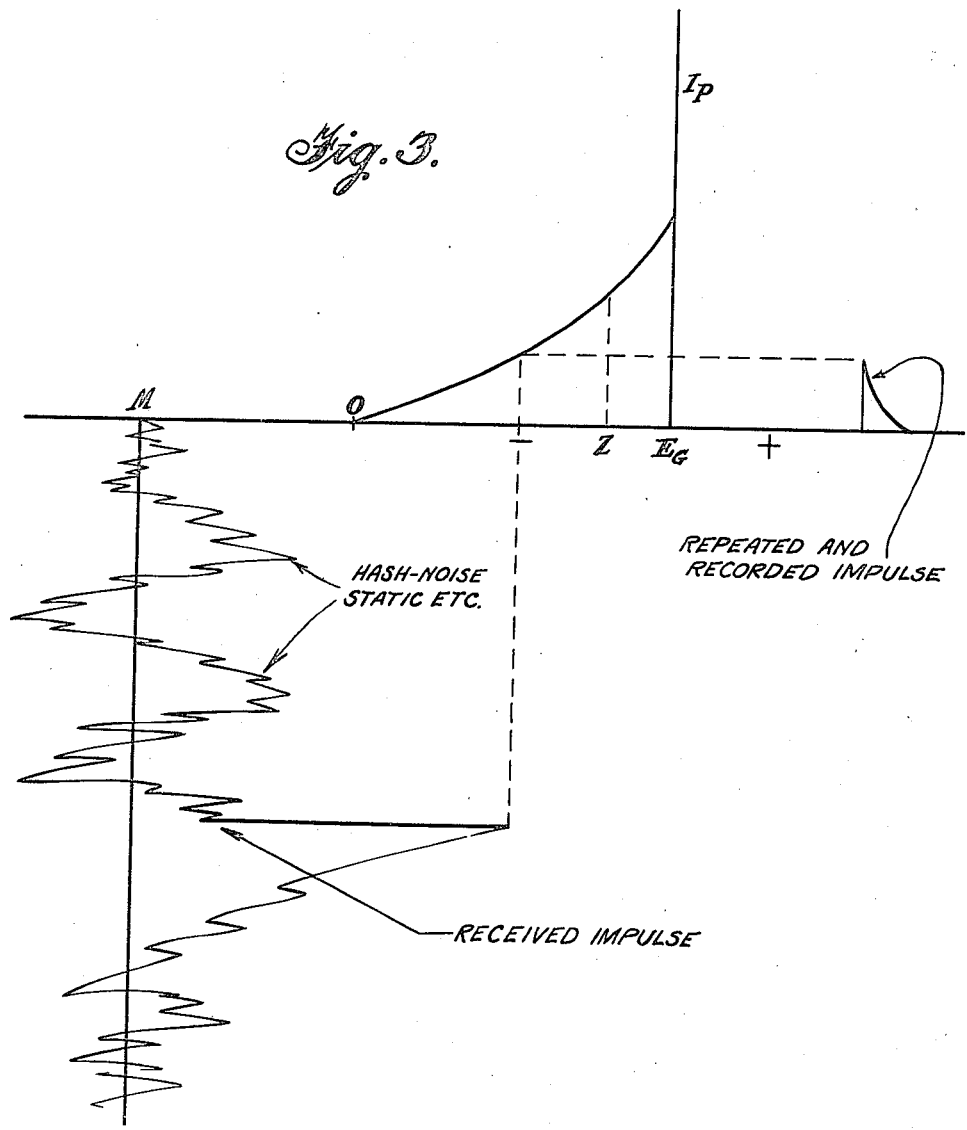

Patented July 21, 1942

2,290,773

UNITED STATES PATENT OFFICE 2,290,773

ELECTRIC SEISMOGRAPH

Earley M. Shook and Robert W. Olson, Dallas, Tex., assignors, by mesne assignments, to Socony-Vacuum Oil Company, Incorporated, New York, N. Y., a corporation of New York Application October 23, 1940, Serial No. 362,472

3 Claims. (Cl. 177—352)

This invention relates in general to the art of seismic surveying and more particularly to a method and apparatus for receiving uphole geophone, time break, and communication signals which have been transmitted by means of radio.

In conducting geophysical surveys by means of the seismic method it is often necessary to resort to the use of radio for the transmission of certain signals from the shot point to the receiving point, in addition to the normal voice communication signals. The most important of these signals is a signal generated coincident with the detonation of the explosive charge which creates the seismic waves in the earth's surface, known in the art as the time break signal, and a signal impulse or impulses from a geophone planted adjacent the mouth of the shot hole which has been actuated by waves travelling vertically from the explosive charge to the surface of the earth.

In order to reduce the amount of equipment necessary to conduct these field operations and to facilitate the operation of the apparatus, it is desirable to transmit these signals as well as voice communication signals by means of a single radio transmitter without the one interfering with the other. Of equal importance or even more importance is the reception of these signals at the recording station and recording the time break and uphole geophone signal without interference such as would be occasioned by voice signals or other spurious voltages such as those picked up by the microphone at the transmitting station, static, commutator ripple from the blasting machine generator and other spurious voltages generated in the blasting and time breaking circuit.

The present invention is therefore directed to a method and apparatus overcoming the above enumerated difficulties by providing means whereby the time break and uphole geophone signals can be recorded on the trace of a seismogram by a multiple element galvanometer at the necessary amplitude and at the same time suppressing all other signals which would tend to interfere with the desired signals.

Another object of this invention resides in the provision of a radio receiver by means of which signals such as the uphole geophone signal or time break signal can be received simultaneously with voice communication signals without the one interfering with the other.

Figure 2:
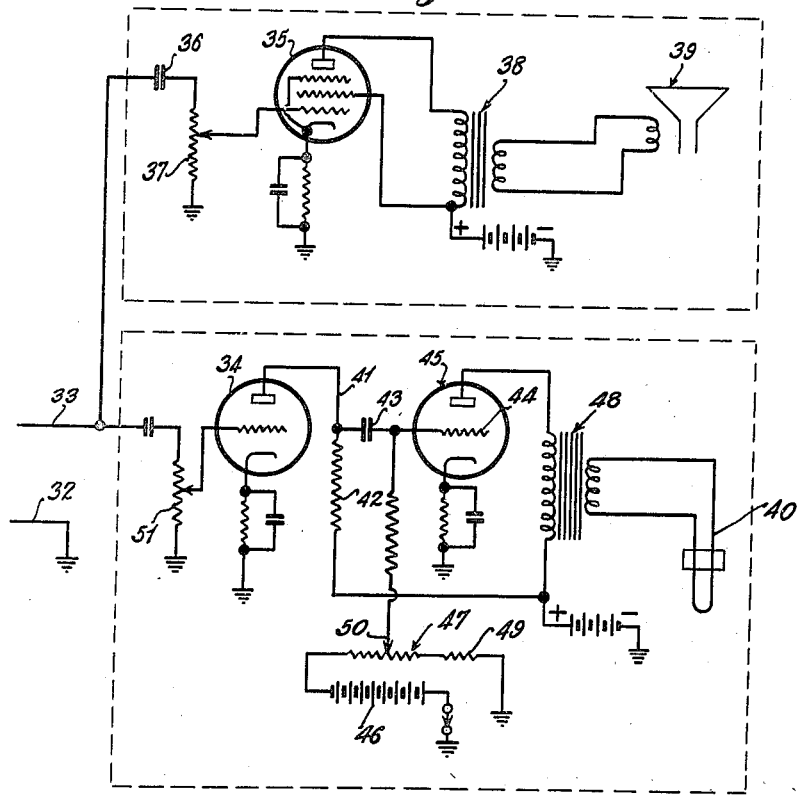

Other objects and advantages will become apparent from the following detailed description when considered with the attached drawings in which:

Figure 1 is a circuit diagram of one embodiment of the present invention showing means whereby signals other than the uphole geophone and time break signals can be suppressed;

Figure 2 is a modification of the embodiment disclosed in Figure 1 showing a circuit diagram by means of which the uphole geophone signal or time break signal and voice communication signals can be received simultaneously without the one interfering with the other; and Figure 3 is a typical characteristic curve of a vacuum tube showing the manner in which low amplitude signals, such as voice, static, commutator ripple, etc. are blocked.

Referring to the drawings in detail, particularly Figure 1, there is illustrated an electrical circuit by means of which either the uphole geophone and time break signal or voice communication signals can be selectively received. In the manner well known in the art, coincident with the detonation of an explosive charge at the shot point, there is generated an electrical signal in the form of a transient voltage or impulse which by means of a radio transmitter of conventional type, can be transmitted by merely connecting the time break signal circuit into the grid circuit of the modulator tube. The transmitting radio set can be of any conventional make so long as voice signals can be transmitted by it. Transmitting the time break signal or uphole geophone signal presents in itself no problem but the reception of this signal and recording it on the trace of a seismogram without interference, by the same radio receiver that is used to receive voice communication signals has long been a recognized problem in the seismic phospecting art, for without some means for suppressing voltages such as those generated in the receiving circuits that are occasioned by voice signals or other spurious voltages such as commutator ripple, the desired signals would be obscured.

In Figure 1 conductors 10 and 11 from the detector or intermediate amplifier of a conventional radio receiving set conduct signals received through the condenser 12 to the grid 13 of the tube 14. With the switch 15 in the position shown in the diagram, the tube 14 is functioning in a normal manner with its proper bias and as a result voice signals as well as other signals would be communicated from this tube to the primary winding 16 of the transformer 17. The output signals from the secondary winding 18 of the transformer 17 are conducted to a coil 19 of a loud speaker unit 20. Since a vibrating element of the recording galvanometer 21 is connected in series with the speaker coil 19 any signals passing through the transformer 17 would set the vibrating element to vibrating. Therefore, some means must be provided whereby the vibrating element will remain quiet during the time preceding the time break, subsequent to the time break and preceding the uphole geophone signal reception and subsequent to the reception of the first seismic waves. To this end taps 22 and 23 have been provided for contactors 24 and 25 of the switch 15. For simplicity of operation contactors 24 and 25 of the switch 15 are mechanically connected together so that they can be moved as a unit. Movement of the switch 15 to the "down" position so that contactors 24 and 25 will contact the points 22 and 23 respectively, a relatively large grid bias potential will be placed on the grid 13 of tube 14 by means of the battery 26 and resistances 27 and 28. This relatively large negative grid bias causes the tube 14 to operate at a point on its characteristic curve beyond the point of cut-off. When operating on this portion of its characteristic curve, low amplitude signals such as those occasioned by voice communication, commutator ripple, etc. are blocked and only high amplitude signals such as the time break and uphole geophone signals are transmitted through the tube to the transformer 17 and on to the vibrating element of the recording galvanometer 21.

This action is explained by reference to Figure 3. This is a typical curve of a vacuum tube with plate current as ordinates and grid voltage as abscissae. The point Z is the correct bias for receiving voice signals. If the bias is changed to the point O, the plate current is just cut off. Any signal added to the grid voltage at this point such that their sum is less negative than the point O will cause plate current to flow. If the signal makes the grid more negative, nothing happens in the plate circuit. If the grid bias is operated at the point M, a signal of amplitude O—M must be applied to the grid before current will flow in the plate circuit. The point M is selected so that unwanted noise such as static, will be less in amplitude than O—M. This prevents any disturbance on the seismogram trace before the arrival of the desired impulses. The desired impulse derived from the time break or uphole geophone break is superimposed on the undesired signal but is greater in amplitude. That part of the desired impulse which is greater in amplitude than O—M produces plate current and it does so in the manner shown. The repeated signal contains only the desired impulses. In addition to cutting out incoming undesired signals, this scheme also eliminates disturbance to the trace due to shot effect, thermal agitation, and unsteady battery potential because the plate current is entirely cut off.

In order to adjust the noise level of the system, the resistance, of which 27 is a part, is in the form of a voltage divider. The tap 29 can be adjusted either to the left or to the right to increase or decrease the bias voltage placed on the tube 14 to bias it beyond its point of cut-off.

In operation, voice communication signals are received while the switch 15 is in its "up" position, as shown in the diagram of Figure 1, with the tube 14 operating in its normal manner with its normal bias. Then when it is desired to make a record, the switch 15 is depressed so that the contactors 24 and 25 engage the points 22 and 23 respectively to place a negative grid potential on the grid of tube 14 to bias it beyond its point of cut-off. The circuit in this condition is ready for the reception of the time break and uphole geophone signal as well as waves generated subsequently by the geophone 30 after amplification by the amplifier 31.

In Figure 2 there is shown another embodiment of the present invention differing from that shown in Figure 1 in that with the circuit of Figure 2 it is possible to receive and record time break signals and uphole geophone signals at the same time that voice communication signals are being received. In this form of the invention signals from a detector or intermediate amplifier can be conducted into the circuit by means of conductors 32 and 33. These signals are introduced into the grid circuits of tubes 34 and 35, each of which form a part of two separate amplifier channels. The top channel comprising the condenser 36, the variable resistance 37 tube 35, transformer 38 and speaker 39, operate in the normal manner to receive and amplify voice communication signals. The bottom channel serves to transmit high amplitude signals such as the time break or uphole geophone impulse to the vibrating element 40 of a multiple element galvanometer, by means of which the signals are recorded on a seismogram. Tube 34 of the bottom channel operates in the normal manner as an amplifier tube. Signal currents flowing in the plate circuit 41 of tube 34 produce an IR drop in the resistor 42. This IR drop is impressed through the condenser 43 on the grid 44 of tube 45. Tube 45 is biased to a point beyond cut-off by means of the battery 46 and a voltage divider 47. With tube 45 operating in this manner, signals such as voice communication signals and commutator ripple from the blasting circuit will be blocked and only high amplitude signals will be transmitted to the transformer 48 and to the vibrating element 40 of the multiple element galvanometer. Resistance 49 is placed in the circuit of the battery 46 in order to provide a minimum bias for tube 45. By varying the contact 50 of the voltage divider, the circuit can be adjusted to any noise level desired. The variable resistances 51 and 37 are placed in the grid circuits of tubes 34 and 35 in order to provide an amplitude control for the incoming signals. With tube 35 operating in the normal manner, communication signals can be transmitted to the speaker 39 simultaneously with the reception of the time break and uphole geophone impulse without the communication signals in any way interfering with them.

We claim:

1. An apparatus for receiving and recording in a distinguishable manner a time break that is of higher amplitude than voice signals and other disturbing currents by means of an electric seismograph comprising in combination a radio receiving set having a single detecting stage, two amplifying channels connected in parallel that are adapted to receive signals from the detecting stage, at least one vacuum tube in one of the amplifying channels adapted to amplify all signals from the detecting stage, a speaker unit connected to the output of said amplifying channel whereby voice communication signals can be received, at least one amplifying tube in the second channel, means for biasing said tube to a point beyond cut-off, said bias being high enough to suppress signals of amplitudes lower than the amplitude level of the time break signal and means actuable by the output signal of said tube for recording the output signal, whereby the high amplitude time break signal can be recorded free of other signals such as static and voice communication signals.

2. An apparatus for receiving and recording in a distinguishable manner a time break signal and uphole geophone impulse that is of higher amplitude than voice signals and other disturbing currents by means of an electric seismograph comprising in combination a radio receiving set having a single detecting stage, two amplifying channels connected in parallel that are adapted to receive signals from the detecting stage, at least one vacuum tube in one of the amplifying channels adapted to amplify all signals from the detecting stage, a speaker unit connected to the output of said amplifying channel, whereby voice communication signals can be received, at least one amplifying tube in the second channel, means for biasing said tube to a point beyond cut-off, said bias being high enough to suppress signals of amplitudes lower than the amplitude level of the time break signal and means actuable by the output signal of said tube for recording the output signal, whereby the high amplitude time break and uphole geophone signals can be recorded free of other signals such as static and voice communication signals.

3. An apparatus for eliminating spurious signal voltages from a radio receiving set while receiving and recording signals such as a time break signal and uphole geophone signal that are of higher amplitude than voice signals and other disturbing currents that comprises in combination a detecting stage, at least one amplifier tube adapted to amplify signals from the detecting stage, means for biasing said amplifying tube to a point beyond cut-off, said bias being high enough to suppress signals of amplitudes lower than the amplitude level of the time break signal whereby only high amplitude signals such as the time break signal and an uphole geophone signal will be conducted through the tube, means for recording the output signal from the amplifying tube, and means for separately and simultaneously amplifying and reproducing low amplitude signals.

EARLEY M. SHOOK.
ROBERT W. OLSON.